Nov. 23, 1937.   E. R. ARMSTRONG   2,100,231
SEA BOTTOM ANCHOR SYSTEM AND METHOD OF PLACING THE SAME
Filed June 19, 1934   8 Sheets-Sheet 2

Inventor
Edward R. Armstrong
Wm. L. Edmonds
Attorney

Nov. 23, 1937. E. R. ARMSTRONG 2,100,231
SEA BOTTOM ANCHOR SYSTEM AND METHOD OF PLACING THE SAME
Filed June 19, 1934   8 Sheets-Sheet 8

Inventor
Edward R. Armstrong
By *[signature]* Attorney

Patented Nov. 23, 1937

2,100,231

UNITED STATES PATENT OFFICE 2,100,231

SEA BOTTOM ANCHOR SYSTEM AND METHOD OF PLACING THE SAME

Edward R. Armstrong, Hollyoak, Del.

Application June 19, 1934, Serial No. 731,380

15 Claims. (Cl. 114—0.5)

This invention relates to sea bottom anchors, and broadly to the art of employing anchors in great depths of water, and to forms of anchor structures and systems which may be readily and correctly positioned in proper manner upon the sea bottom.

Anchors of various types have been proposed and used for many years. In my prior Patents Nos. 1,378,394, 1,511,153 and 1,892,125, I have disclosed and claimed seadrome structures or floating apparatus adapted for employment upon the ocean surface, under all conditions of waves and weather. Such structures are primarily intended to be located at a predetermined latitude and longitude and there maintained by an anchor system. Owing to the exposure of such vessels to wind and wave action, and owing particularly to the great depth of water at many points of the globe where such vessels are to be situated, it is essential to have an anchor competent of resisting considerable stresses, capable of being positioned properly upon the sea bottom, and so constructed and arranged in coordination with the anchor cable as to avoid any fouling while in service.

Furthermore, since the ocean at many points of the globe where such vessels may be located, has a depth of many thousand feet, it is essential to provide a system and method of placing the sea anchor in such a way that fouling of the anchor cable may not occur during the sinking of the anchor. Owing to the great sizes and weights required by such anchors, they are preferably to be constructed at shore and towed to position as buoyant vessels; and then permitted to sink by destroying their relative buoyancy. It is therefore essential to design the anchor itself so that it has a proper shape for engaging with the sea bottom, after it has been positioned, a proper shape for stability while being towed to position, and a proper shape and disposition for being attached to an anchor cable without difficulty of fouling, and permitting the sinking of the anchor with a proper orientation.

The present invention therefore proposes a particular shape and construction of an anchor, and of the system including the anchor and the anchor cable, as well as the system for determining a proper locating or sinking of the anchor to the sea bottom; along with the method of accomplishing these purposes.

An illustrative form of practicing the invention is set forth in the accompanying drawings, in which.

In these drawings, the anchor which is positioned during service at the bottom of the ocean, is comprised of a generally convex upper wall which is substantially symmetrical about any upright diametrical plane, with a cable attachment in the upright axis thereof, and having a closing bottom wall and a conical internal wall, the several walls together providing a buoyancy chamber which permits the towing of the completed anchor to the desired latitude and longitude of its immersion. Preferably the extreme peripheral edge is formed as a shoe and extends below the aforesaid bottom wall to provoke a penetrating action of the anchor, into the material of the sea bottom, as transverse strains are imposed thereon, so that ultimately the sea anchor becomes embedded in the material of the sea bottom with a resulting increase in its resistance to horizontal and tilting movements.

Figure 6:
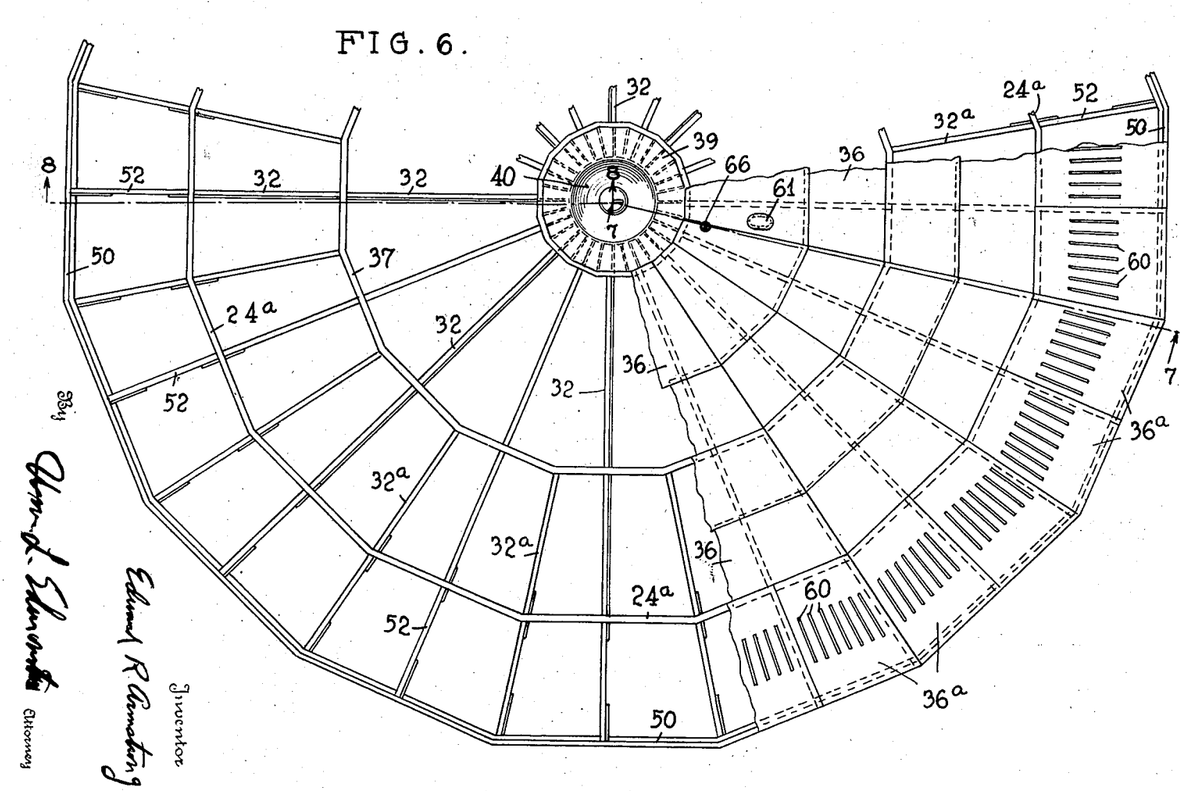
Figure 6 is a plan view, on a scale intermediate those of Figures 1 and 2, of the anchor, with parts broken away to show the arrangement of the beam members thereof.
Figure 7:
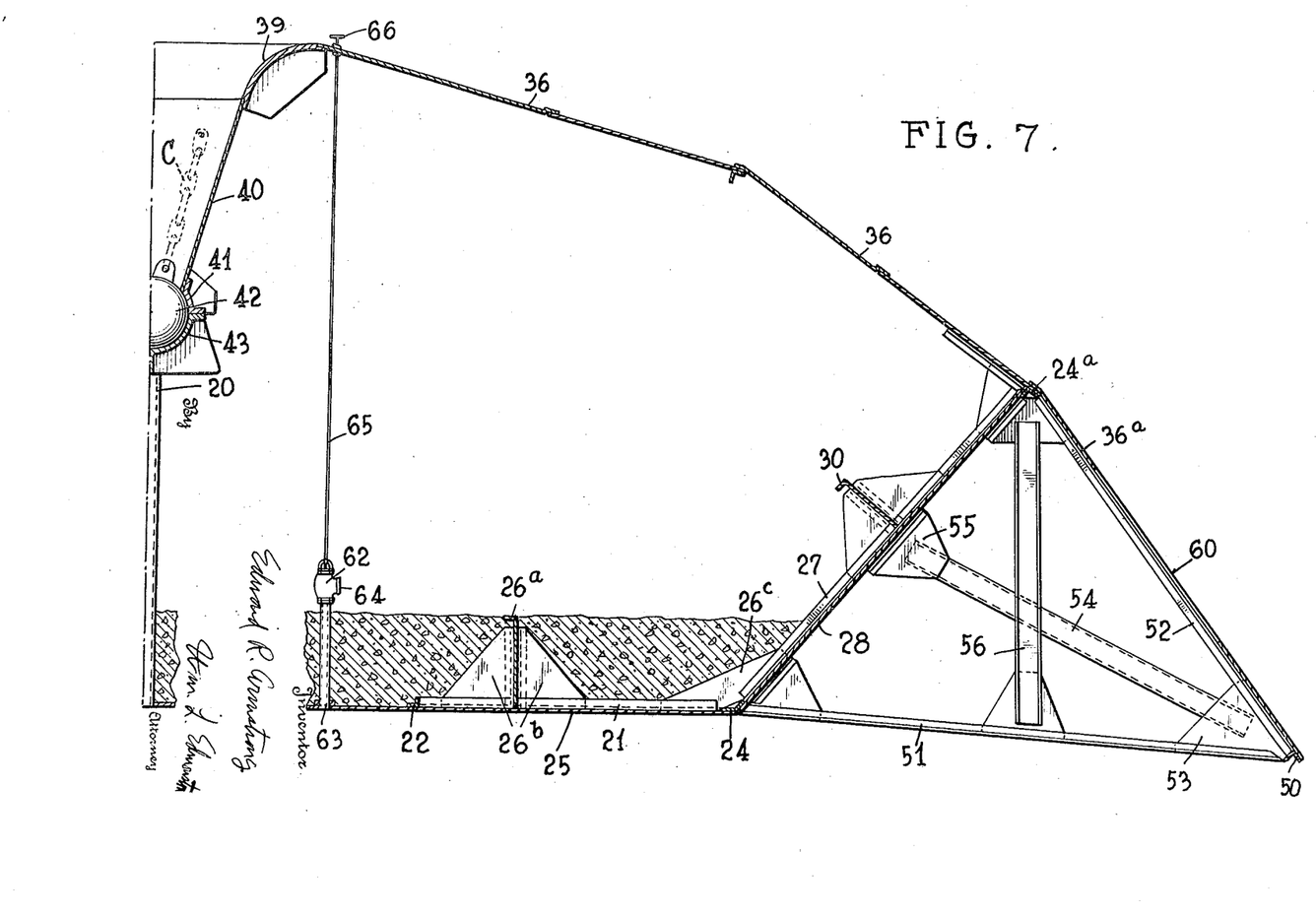
Figures 7 and 8 are upright sectional views of the same substantially on lines 7—7 and 8—8 of Figure 6, each view showing substantially one-half of the diametrical dimension.
Figure 8:
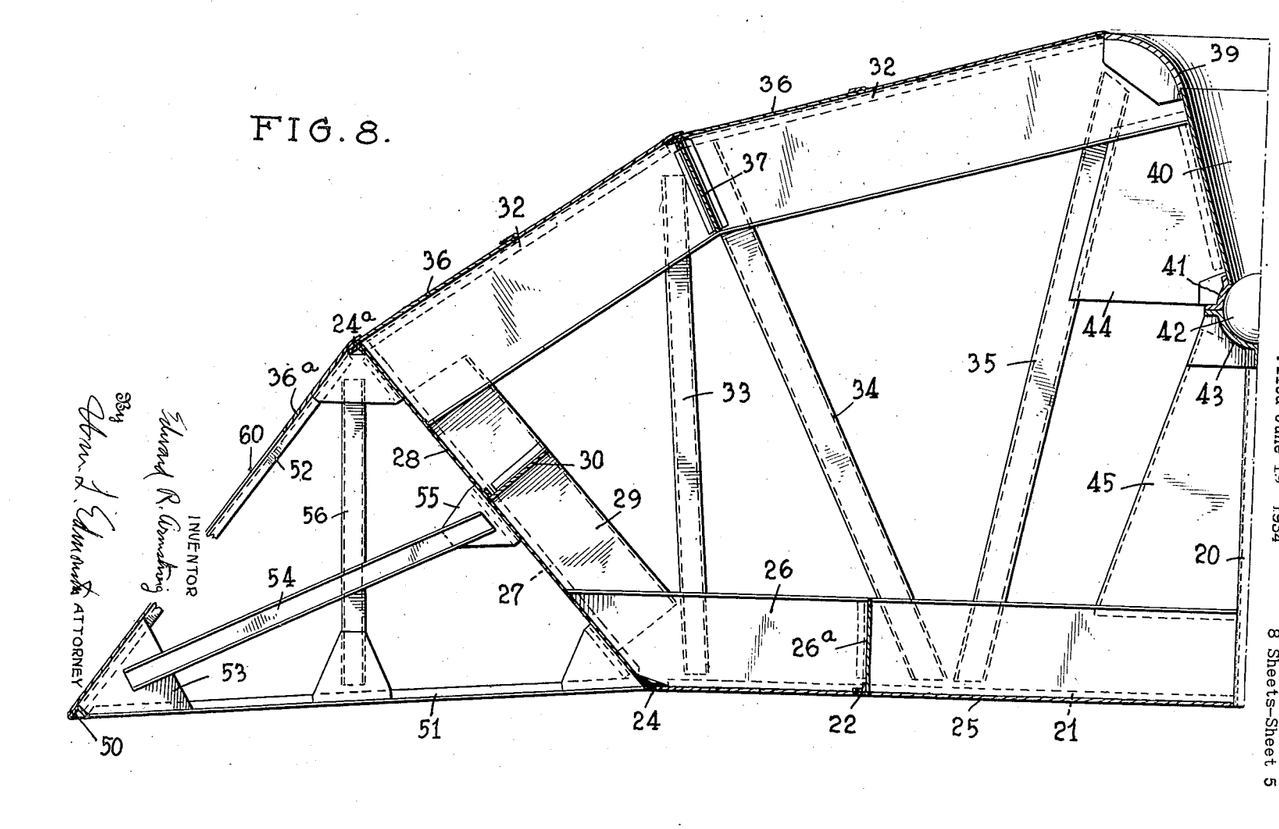

As illustrated in Figures 6, 7 and 8, the anchor may include a strong pipe 20 at the vertical axis thereof, extending from the bottom wall to the socket which receives the connection for the anchor chain. Extending radially from the pipe 20 are a plurality of angle members 21 of any desired cross section, which are joined by chordally extending members 22. Intermediate angle members 23 may be provided in any desired shape and number to provide a stiff lattice work between the central pipe 20 and a ring 24 formed of angle metal and providing the lower stiffener of the buoyancy chamber proper. It will be noted that the ring 24 is polygonal in shape, in order to obtain the best utilization of the material, without expensive bending and flanging. This bottom lattice is covered with metal plates 25 to provide the aforesaid bottom wall, these plates being secured at frequent and proper intervals to the members of the lattice. In radial planes adjacent to the members 21 are provided a plurality of stationary plates 26 which extend from the bottom wall upwardly into the buoyancy chamber and are secured to the aforesaid members and to the central pipe column 20. These plates 26 therefore operate directly as truss members for the bottom wall and also operate as parts of general trusses for stiffening the entire anchor.

Upwardly and outwardly inclined angle members 27 extend from the ring 24 and to them are connected the side wall plates 28, these plates providing in effect an upwardly divergent conical wall for the sides of the buoyancy chamber. These side walls are likewise stiffened by crossed plates 29 and 30 having their edges secured to the side walls and the angle members 28 and 30 thereof, and extending away from said wall to stiffen the same against bulging under internal and external pressures. The lower ends of the plates 29 are fitted against the bottom reinforcing plates 26 and secured thereto.

Top girder members 32 are connected together and extend from the side wall 28 toward the axis of the anchor, the successive sections toward the center being arranged at a lesser angle than the more remote section. These girders are connected together, and connected to the sheets of the side walls 28 and to the reinforcing members and plates 27 and 29 thereof. Also, the girders 32 are formed with the bottom wall and its plates 26 into a strong truss system in upright diametrical planes of the anchor by the use of posts or columns 33, 34 and 35, which are directed at various angles and are well tied at top and bottom to the members.

The top of the anchor is formed of metal sheets 36 which are secured to the upper flanges of members 32 and to the corresponding flanges of interposed similar members 32a. In a peripheral direction, the structure is further stiffened by chordal members 37 which appropriately have the same general dimensions as the beam sections 32 themselves. The inner sections 32 are connected as aforesaid to the posts 35, and are also connected to a wear ring 39 which has an inwardly and downwardly curving shape in cross section (Fig. 7) for receiving and guiding the anchor cable. A conical structure 40 has its inner surface substantially tangential to the guiding surface of the wear ring 39, and serves to render the buoyancy chamber sealed against the entry of water or escape of air while the anchor is being towed to the desired latitude and longitude. At the lower end, the conical wall 40 joins the upper heavy socket member 41 which retains a clamping ball 42 to which the lower end of the anchor chain C is secured. A heavy lower socket member 43 retains the ball 42 but permits a relatively free movement thereof in the socket. The two socket members 41 and 43 are joined together during the construction of the anchor, and are secured and braced by radial plates 44 and 45 which are tied to the inner sections 32, to the columns 35, to the pipe 20 and to the bottom reinforcing plates 26. It is preferred also to further stiffen the bottom sheets 25 of the bottom wall by circumferentially extending reinforcing plates 26a, which are joined to the reinforcing plates 26 and to the bottom sheets by the employment of suitable connecting means which may include angle members 22 as stiffeners. Normally, in order to attain a sufficient weight, the bottom of the buoyancy chamber formed by the sheets providing the walls 25, 28 and 36, is filled with a ballast such as concrete. This ballast is stiffened and reinforced by the aforesaid plates 26 and 26a, and also by gusset plates 26b and 26c which tie the plates 26 and 26a to the side walls and to intermediate members 23 of the lattice structure.

The peripheral edge or shoe of the anchor is formed by a ring of angle members 50 which are located below the general plane of the bottom wall 25. The angle members 51 extend from the lower ring 24, while angle members 52 extend from the upper ring 24a and are connected to this shoe. A further stiffening is afforded by the gusset plates 53 located at the angles of the triangular section provided by the angle members 51 and 52 in conjunction with the side wall 28, at various upright diametrical sections through the anchor. The inward thrust from the shoe 50 toward the axis of the anchor, along such a section, is assumed and transmitted by a member 54 operating in endwise compression and transmitting its effort through a gusset plate 55 to the side wall 28 and to the reinforcing plates 29 and 30 thereof, whereby such stresses are distributed largely over the anchor. The aforesaid triangular section is further stiffened against yielding under influences of gravity, as during tilting of the anchor about a horizontal axis at right angles to the plane of such section, by post members 56 which are tied to upper gusset plates 53 and to the lower angle members 51 and to the members 54. It will be understood that the top wall sheets 36 are continued past the ring 24a as sheets 36a, these latter sheets however having preferably a plurality of apertures 60 therein. It is preferred to have these apertures in the form of slots. The bottom of this triangular peripheral section is open, and hence water beneath the anchor may flow upwardly through the aforesaid slots, being retarded thereby. Furthermore, such slots are of advantage during the initial stages of sinking of the anchor, as they permit the free escape of air as the buoyancy chamber becomes flooded, and prevent tilting movements about a horizontal axis of the anchor as a whole. It may be pointed out that such tilting movements might result in a sidewise plunging of the anchor, and that the great weights involved render such plunging dangerous and the positioning of the anchor uncertain.

Figure 11:
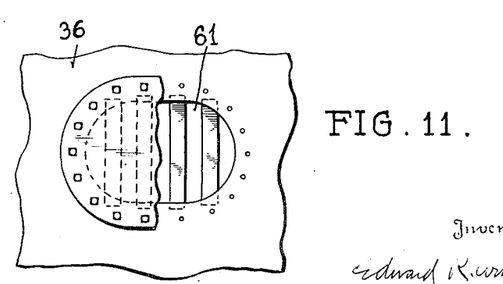
Figure 11 is a detail view, on a large scale, of a manhole with its grating and cover.
Figure 12:
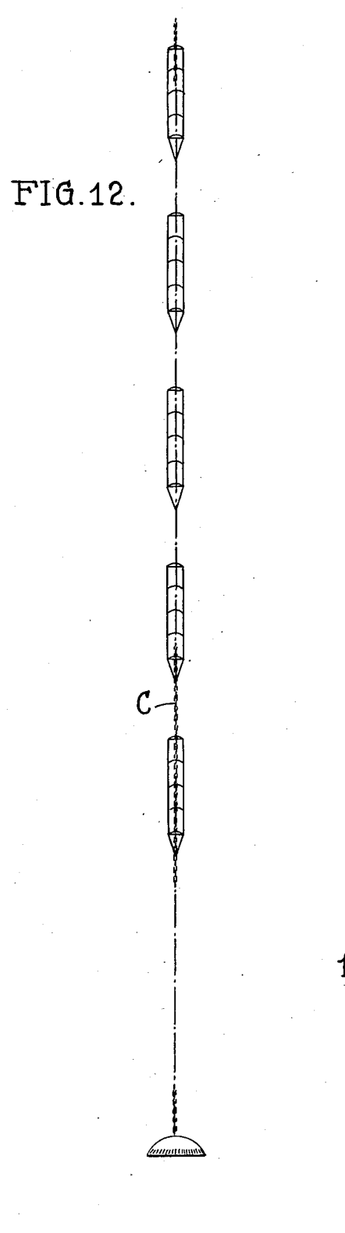
Figure 12 is a view showing the anchor with its anchor cable and a plurality of sea anchor or parachute systems for retarding the descent.
Figure 13:
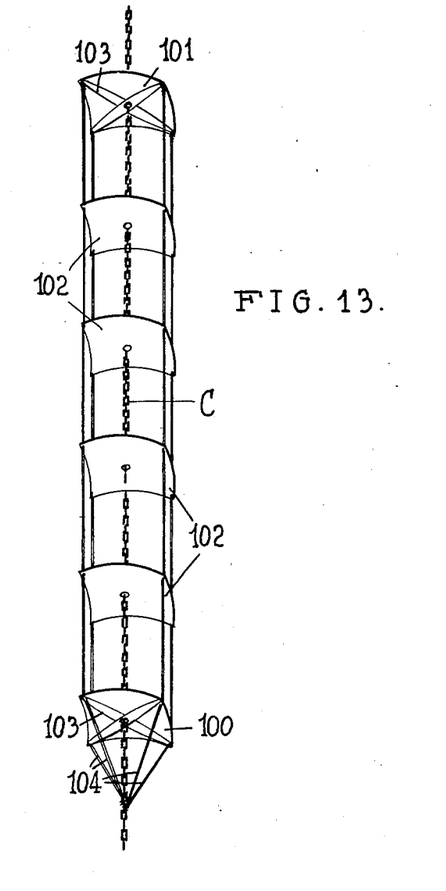
Figure 13 is a perspective view showing the assembly of one of these sea anchor or parachute systems.
Figure 14:
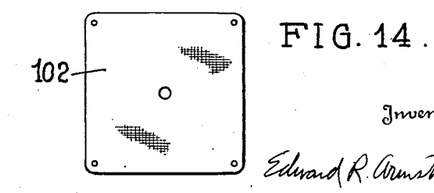
Figure 14 is a detail view of one of the parachute or sea anchor sheets.

It is preferred to provide the top sheets 36 with a plurality of manholes 61 through which access may be maintained to the interior of the anchor during construction. When the anchor is completed and ready for towing to position, it is preferred to close these gratings by firmly attached bars, to prevent accident during sinking, as thus no one may enter the anchor after it leaves the shore. During the towing of the anchor to the desired latitude and longitude, each manhole is closed by a corresponding sealing plate so that water may not enter nor air escape. At least one sea valve 62 is provided, with an inlet pipe 63 communicating through the bottom wall 25 of the anchor and having an outlet 64 into the buoyancy chamber. This valve is closed while the anchor is being towed to position. A stem 65 extends upwardly and terminates outside of the top wall sheets 36 with a hand wheel 66. Sinking of the anchor is accomplished by removing the covers of the manholes and opening the valve 62 by a handle 65. The entering water displaces air from the buoyancy chamber proper, this air escaping through the aforesaid manholes in a regular manner.

Figure 3:
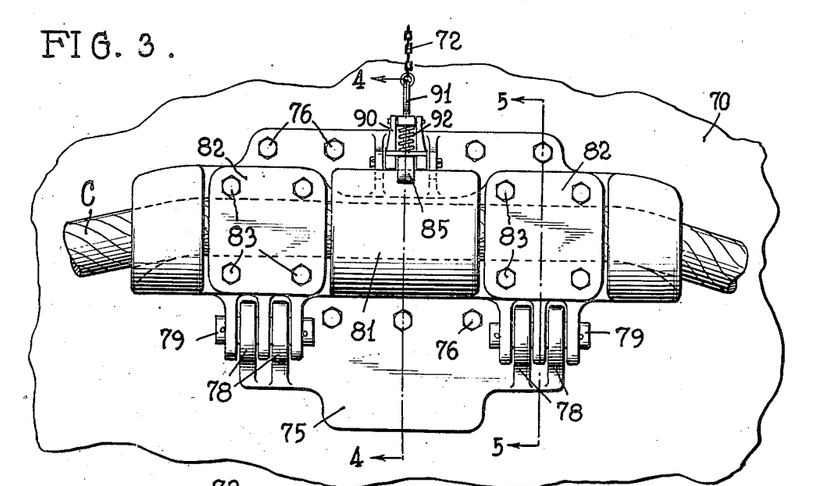
Figure 3 is a detail view, on a yet larger scale, showing a single anchor cable clamp in elevation.
Figure 4:
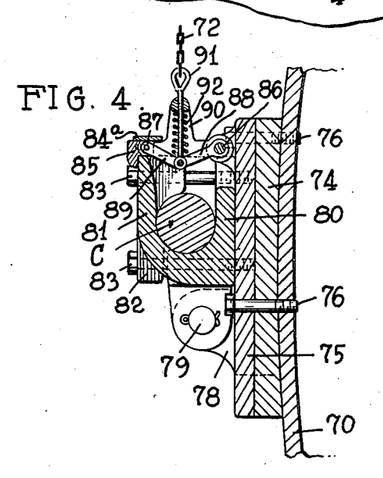
Figure 4 is an upright sectional view substantially on line 4—4 of Figure 3.
Figure 5:
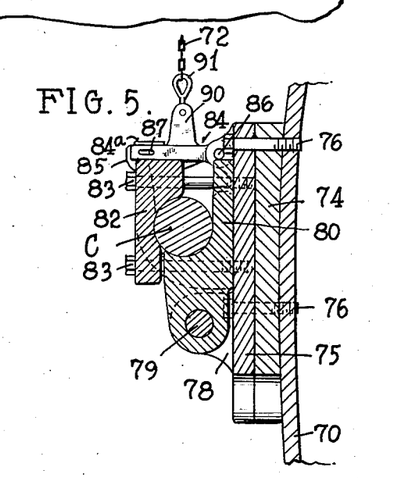
Figure 5 is a similar sectional view substantially on line 5—5 of Figure 3.

The anchor so constructed and assembled at shore is provided there with the proper anchor chain and then the system is towed to the desired latitude and longitude. The great size and weight of the anchor chain and the anchor make it desirable that the immersion of the anchor should occur without any attempt to support it or the anchor chain by any windlass system. Therefore, the present invention proposes that the length of the anchor chain be supported during the operation of preparing for immersion of the anchor, by a plurality of pontoons. The cable is released from these pontoons at the moment of final submersion of the anchor beneath the surface, and the anchor and anchor cable are caused to fall or descend in the water at rates which are in consonance with one another. The several buoys 70 are illustrated as being simple substantially cylindrical air chambers of normal construction. Within each of these is located a tripping device 71 which is diagrammatically illustrated as a power windlass and is to be understood as being operated from a remote point to produce a pull upon a trip line 72 on a particular pontoon. Preferably, the devices 71 upon all the pontoons are released in exact simultaneity. In the illustrated form, the anchor cable or the anchor is shown as comprising two separate lines each extending from an anchor buoy to the anchor. These are supported individually at the ends of each pontoon by a release clamp as shown in Figures 3 to 5. A spacer plate 74 rests against the corresponding end of the pontoon, and the clamp plate 75 is secured to the pontoon as by cap screws 76. The plate 75 also has eyes 78 for receiving the pivot pins 79 upon which is supported the swinging cradle having a back wall 80 and a lower and centrally located front wall 81. The cable section C is received between these walls. At the ends, the cradle is provided with a pair of upwardly open hooks which also support the corresponding cable section C. While the cable and anchor are being towed to location, clamping pieces 82 are located opposite the extended ends of the back wall 80 and are secured in position by bolts 83 which pass through apertures in these extended ends of the back wall 80 of the cradle into the plate 75, so that the releasing trip described hereinafter is not competent of releasing the cable accidentally. The releasing trip includes a lever system 84 pivoted on a pivot pin 86 carried by brackets of wall 75, and having slots therein and a guide plate 84a thereon. A sear block 85 is slidable along the guide plate and has a nose engaged outside of the wall 81 to prevent swinging and dropping of the cradle, this sear block 85 having a pin 87. A toggle structure includes a link 88 likewise pivoted on pin 86 and a second link 89 pivoted to link 88 and carrying the pin 87 at its free end in guided relation in the slots of the lever system 84.

The trip or release cable 72 is connected to a sliding member 91 movable between extensions 90 of the lever system 84 and connected at its lower end with the pivot joining the toggle links 88 and 89. A thrust spring 92 normally presses the toggle toward its lower position, so that the sear block 85 is maintained in resilient contact with the front wall 81 of the cradle for locking the cradle against dropping. The operation of the release is as follows:

Upon reaching the desired location, when the buoys have been strung out in a row, the screws 83 are removed and clamping plates 82 detached. Prior to this time, it is possible to inspect each releasing device easily, as it is normally held above the water level by its pontoon; and likewise it is possible to test out the tripping devices 71 to make sure they operate. During this time, the clamping plates 82 and screws 83 prevent accidental dropping of the cable. Upon removing the plates, however, the operation of the tripping devices 71 causes a traction on the cables 72 of the several clamps so that the sliding members 91 are raised. Therewith the toggle links 88 and 89 are caused to straighten and the pin 87 is pressed outward to reduce the friction between the sear block 85 and the front wall 81. As the friction decreases, ultimately the lever system 84 is raised about its pivot, and the cradle is freed for outward and downward movement, as its pivot pins 79 are located offset from the upright plane through the cable section C (Fig. 5). It will be seen that the single tripping device 71 of a pontoon is connected to both release clamps of such pontoon.

Figure 9:
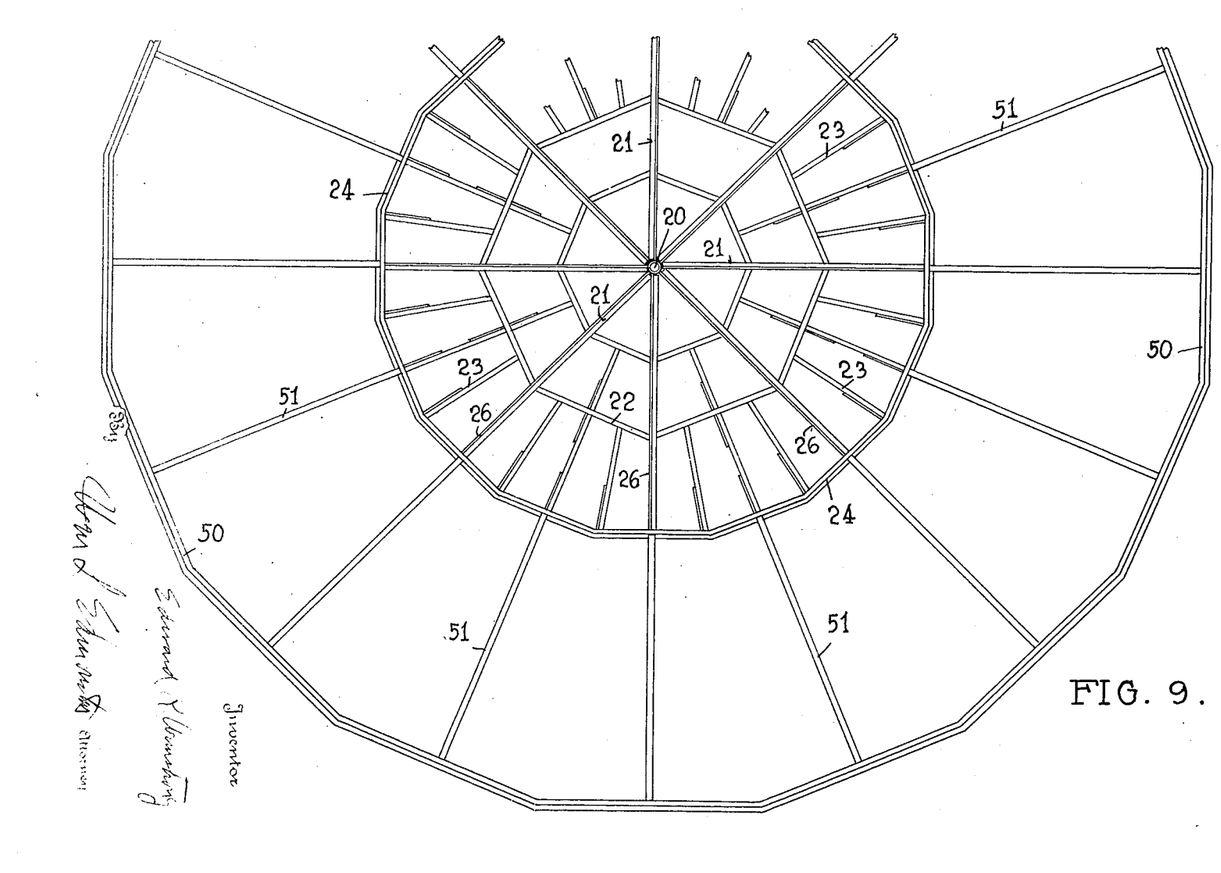
Figure 9 is a fragmentary bottom view, showing the arrangements of the beam plate, girder and ring members thereof.
Figure 10:
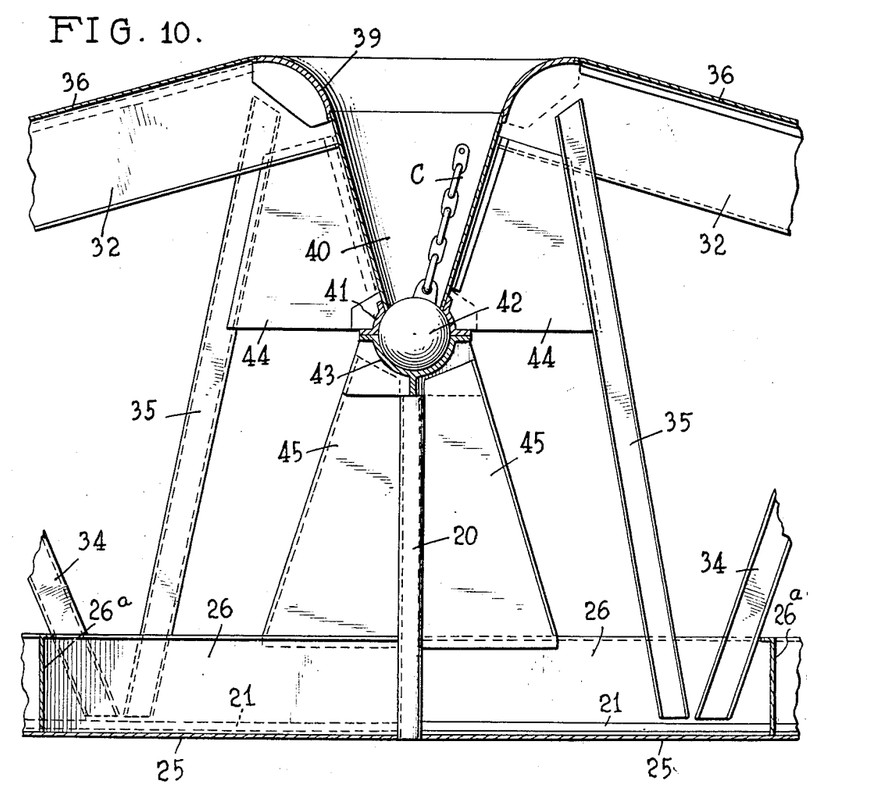
Figure 10 is a detail view on a large scale, of parts of Figures 7 and 8, showing the socket and clamp arrangement for the lower end of the anchor cable.

Since the anchor has a much greater weight per square foot of resistance area than the cable, it is necessary to retard the anchor in its descent. Furthermore, it is essential to provide means for assuring that the anchor will reach the bottom with its shoe 50 in a horizontal plane so that this shoe is first to engage the sea bottom. To this end, a sea anchor or parachute system is provided. It is preferred to provide a plurality of these devices accurately calculated to compensate for differences in weight per resistance area in the anchor and the anchor cable. As shown in Figure 9, each sea anchor or parachute is preferably comprised of a bottom spreader section 100 and a top spreader section 101 with a plurality of intermediate non-spreader sections 102. Each of these sections includes a heavy canvas parachute sheet which is illustrated as substantially square in shape and located at a general right angle to the direction of the anchor cable sections, each having a hole at its center for the reception of the two anchor cable sections. The spreader sections include the spreader spars 103 which extend diagonally from corner to corner of the correspondent parachute sheet. Spreader or strain ropes 104 are connected to the anchor cable and extend at an angle to the ends of the spreader spars 103 of the lower member 100 and then pass to the ends of the spreader spars of the other member 101, being connected to the corners of each of the successive parachute sheets to thus hold them distended during the descent of the anchor. In the illustrated form, five such sea anchor or parachute systems are employed. In this connection, also, it may be pointed out that the illustrated anchor is assumed to be 96 ft. in diameter and to have a height from bottom wall to the top of the wear ring of about 27 ft. and to weigh about 1,300 long tons in the water. The use of five such sea anchor or parachute systems, each comprising five canvas parachute sheets 20 ft. square, reduces the rate of speed of descent of the anchor to around 350 ft. per minute.

Figure 1:
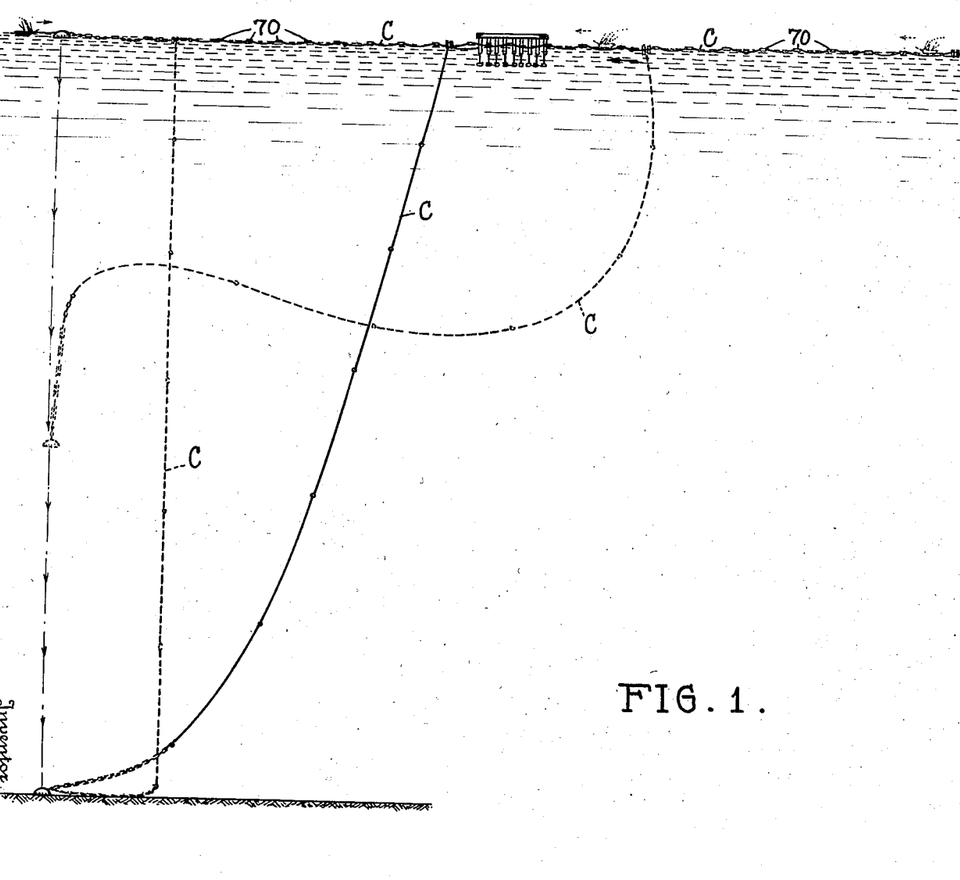
Figure 1 is a small scale view showing the successive positions of the anchor, the anchor cable, and the dropping apparatus during the positioning of the anchor upon the sea bottom.
Figure 2:
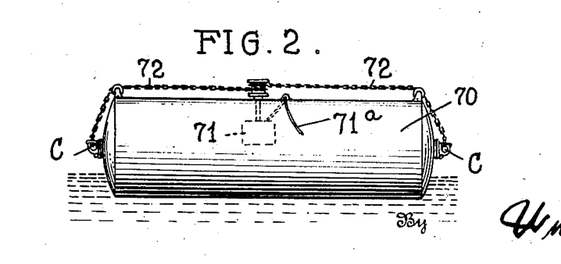
Figure 2 is a detail view on a far larger scale, of a pontoon with anchor cable clamps and release mechanism thereon.

The method of placing the anchor is to construct it and to assemble the cable therewith at shore and then to tow the system by the buoyancy of the anchor and of the cable-supporting pontoons to the desired latitude and longitude. The trip devices are inspected and tested, and they are preferably all connected for simultaneous movement. The cable is then pulled out by towing ships attached to the anchor and to the buoy end of the anchor cable, until it is substantially straight, being supported from point to point (such as at 500 ft. intervals) by the pontoons. The manhole covers are removed and the sea valve in the anchor is opened. When the anchor has fallen to such an extent that water begins to enter the manholes from the exterior and the anchor is ready to take its final plunge, the trip devices are energized and the cable is released. The cable and anchor then descend in the water, the aforesaid sea anchors or parachutes operating to keep the anchor proper in the desired position, while the tow boat attached to the anchor buoy moves it back toward the point at which the anchor sank to avoid a horizontal pull upon the cable from the buoy. The dash and dot lines on Figure 1 indicate an intermediate position of the cable during the descent of the anchor, and while the towing ship is moving the anchor buoy back toward the anchor position. Ultimately, the cable attains a position as shown by the heavy lines in Figure 1, and the buoy is then ready for connection to a seadrome.

It may be pointed out that it is preferred to have bridge cable employed for the upper portions of the cable, in each section thereof, but that it is preferable to have chain for the lowermost portion. The bridge cable is preferably of successively larger diameter in the sections extending upwardly from the chain connection, to compensate for the weight of the cable itself. The chain portions at the lower end prevent dangerous wear, kinking or fouling of the bridge cable itself, and also avoid difficulties of fouling with respect to the anchor, which in particular has an upwardly convex form which tends to avoid any fouling even when the anchor has first arrived at the bottom. In the course of time, under the action of horizontal components of stress, the anchor tends to seat itself in the material of the sea bottom, so that fouling is then even less to be feared. After the anchor has been on the bottom for a short period of time, the rubbing and attrition of the chain portions on the bottom and upon the anchor will cause breakage and destruction of the parachutes and supporting members, so that they in no wise interfere with the freedom of the cable in responding to movements of the vessel with respect to the anchor. In the particular illustration, it will be noted that the sea anchors or parachutes are connected only to the chain portion of each cable section, and hence the attachment of the strain ropes of the sea anchor is easy, and the attrition which wears them away will naturally occur. However, it may be pointed out that the great weight and strength of the parts render the action of the sea anchors and parachute negligible even prior to their destruction.

During the towing of the anchor and its cable to the position for sinking, the spreader or strain ropes 104, or some of them, may be released from the anchor cable, and the parachute sheets released from the spreader spars. The spars may then be moved into parallelism at each retardation member having spars, and then swung into and lashed in parallelism with the cable, and the parachute sheets folded and similarly lashed. Thus, the sea anchor or parachute systems cause no serious incumbrance in the preliminary operations of bringing the anchor and its cable to the desired station.

The mechanism 71 for operating the cables 72 may be of any desired type, and is conventionalized as including electric motor and windlass structure which may be energized from a remote point, as by the use of a single electric circuit through the cable 71a.

The large flat bottom area operates during the final phase of sinking, as the anchor approaches the bottom while held in its predetermined position by the drag or retarding effect of the sea anchor or parachute systems, to slow down the movement of the anchor and thus avoid a heavy shock when it alights on the sea bottom. This occurs by the relative confining of the water, which is required to move outward between the sea bottom and the said flat bottom surface by a long path, and thus a cushioning or dampening effect occurs to eliminate the shock, and thus serves to preserve the anchor structure against damage as it alights.

Furthermore, this flat bottom surface is soon in contact over the entire flat area thereof with the material of the sea bottom, and gives a large friction surface so that the pressure of the water upon the anchor assists in holding the anchor in position. That is, while the weight of the anchor itself may be of the order of 1,500 tons, the assistance afforded by the water pressure gives a resistance toward raising or overturning of the order of many thousand, and with the illustrated anchor which is assumed to be 96 feet in diameter, this assisting effect may be of the order of several hundred thousand tons. Thus, the anchor does not depend upon penetration into the sea bottom for its effects.

The anchor system is therefore especially of value in great depths of water, as for example over 3,000 feet, where it is impossible to perform any manual operations upon the anchor itself, and where the anchor is to be permanently located at a definite site. The anchor therefore is arranged to be built on shore, launched and towed to sea while employing its initial buoyancy, and then controllably sinking the anchor at the desired site by rendering the anchor nonbuoyant.

It is obvious that the invention is not limited to the form of execution and practicing illustrated and described, but that it may be employed in many ways within the scope of the appended claims.

I claim:

1. In a deep-sea-anchor device and placing apparatus therefor, an anchor having a cable attachment, cable means connected to said attachment and including a plurality of parallel sections, pontoons each having devices for supporting said sections individually and located above the surface of the water to be capable of inspection and latch means for maintaining the sections on said supporting devices, and means for simultaneously releasing all said latch means.

2. In a deep-sea-anchor device and placing apparatus therefor, an anchor having a cable attachment, a cable, connected to said attachment, pontoons having securing devices for supporting the cable and each operative for holding the corresponding pontoon against movement along the cable, means on each pontoon operative for releasing the securing devices thereon, and means connecting all said releasing means and operative for simultaneously actuating the same.

3. A deep-sea-anchor comprising an externally smooth and upwardly convex top wall having a peripheral shoe and a central aperture, a bottom wall, a peripheral closing wall spaced inwardly from said shoe, a cable securing means located inside said walls, and a conical wall extending from said means to the top wall for closing said aperture, said walls providing a buoyancy chamber.

4. A deep-sea-anchor comprising an upwardly convex top wall having a shoe at its periphery, a smaller substantially flat bottom wall, a closing wall extending from the periphery of the bottom wall to the top wall and spaced from the shoe so that a portion of the top wall projects beyond the closing wall, said walls providing a buoyancy chamber for floating the anchor to position for sinking, said walls being substantially symmetrical about a central vertical axis, said top wall portion having openings for the passage of water during sinking, a cable attachment located at the said axis, and reinforcing means located inside said chamber and connected to said attachment and said walls.

5. A deep-sea-anchor comprising an upwardly convex top wall having a shoe at its periphery, a smaller bottom wall, a closing wall extending from the periphery of the bottom wall to the top wall and spaced inwardly from the shoe, said walls providing a buoyancy chamber, said walls being substantially symmetrical about a central vertical axis, a cable attachment located at the said axis, and reinforcing means located inside said chamber and connected to said attachment and said walls, the top wall having openings therein outside said closing wall.

6. A deep-sea-anchor comprising an upwardly convex top wall having a shoe at its periphery, a smaller bottom wall, a closing wall extending from the periphery of the bottom wall to the top wall and spaced from the shoe, said walls providing a buoyancy chamber, said walls being substantially symmetrical about a central vertical axis, a cable attachment located at the said axis, and reinforcing means located inside said chamber and connected to said attachment and said walls, and including members extending from said shoe toward the axis and connected to said closing wall and the reinforcing means.

7. A deep-sea-anchor comprising an upwardly convex top wall having a shoe at its periphery, a smaller bottom wall, a closing wall extending from the periphery of the bottom wall to the top wall and spaced inwardly from the shoe, said walls providing a buoyancy chamber, said walls being substantially symmetrical about a central vertical axis, a cable attachment located at the said axis, and reinforcing means located inside said chamber and connected to said attachment and said walls, the shoe extending below the plane of the bottom wall, and reinforcing members extending from the shoe to the periphery of the bottom wall.

8. The method of placing a deep-sea-anchor device upon the sea floor, said device including an anchor cable and an anchor having a buoyancy chamber by which it is floated, which comprises buoyantly moving the anchor to the desired latitude and longitude, buoyantly supporting the anchor cable at a plurality of points along its length with the cable extended and connected to an end buoy, flooding the buoyancy chamber and rendering the anchor non-buoyant and simultaneously releasing the cable along its length so that the anchor and cable drop simultaneously, and retarding the descent of the anchor and the adjacent portion of the cable to a rate substantially equivalent to that of the descent of the remainder of the cable to prevent fouling of the cable.

9. A deep-sea-anchor of large size and weight adapted for sinking at a permanent location, and having wall means providing a non-fouling external upper surface when the anchor is in position on the sea bottom, a downwardly open peripheral recess, and a buoyancy chamber, said wall means being substantially symmetrical about a vertical axis, an anchor cable attachment located at said vertical axis, said buoyancy chamber operating so that the anchor may be constructed on shore and launched and towed to position, and means by which sea water may be admitted into said buoyancy chamber for flooding the same at the sinking of the anchor, said wall means including peripheral openings from said recess for the passage of water during sinking, whereby to stabilize the anchor during sinking and cause it to maintain an upright position for proper engagement with the sea bottom, said wall means also providing an upwardly and outwardly inclined first surface and a downwardly and outwardly inclined second surface extending from the upper edge of the first surface to the periphery of the anchor, said first and second surfaces defining a downwardly open recess extending annularly inside of and adjacent the lower edge of the external upper surface, said wall means having openings from said second surface to said upper surface for the passage of air and water, said first surface, recess and openings being effective during the sinking of the anchor to stabilize the same and operating immediately prior to contact of the anchor with the sea bottom for damping and controlling the rate of its downward motion whereby to reduce the shock of contact with the sea bottom.

10. A deep sea anchor comprising an upwardly convex top wall, a bottom wall, a peripheral closing wall extending upward and outward from the edge of the bottom wall, said walls being substantially symmetrical about a vertical axis and forming a buoyancy chamber surrounding said axis, a top wall projecting beyond said closing wall to provide therewith a downwardly open recess at the periphery of the anchor, reinforcing members connected to said walls and to one another to stiffen and reinforce said walls, and concrete ballast material located in the bottom of the buoyancy chamber symmetrically about said axis and reinforced by the reinforcing members in said buoyancy chamber.

11. In a deep-sea-anchor device and placing apparatus therefor, an anchor having a body with a lower peripheral edge to engage the sea bottom and a cable attachment at its top, cable means connected to said attachment, and a plurality of retarding devices secured in spaced relation along said cable means adjacent the anchor and each having a plurality of individual retarding structures secured to the cable and including distending means including spars extending from the cable means, said devices also including means providing retarding surfaces, each device also including tension members connected to the cable means for transferring tension effects along the tension members to the cable means, said tension members also being connected to the spars and to each retarding surface means for maintaining the same fixedly substantially at a right angle to the cable means, said tension members being held away from the cable means by said spars whereby the retarding surface means are effective for producing a constant retarding effort upon the cable means at the points of connection of the tension members therewith, said retarding devices being effective for maintaining the anchor in position for proper engagement thereof with the bottom for diminishing the shock upon the anchor at the moment of engaging the sea bottom.

12. The method of placing a deep-sea-anchor device upon the sea floor, the anchor of said device having a sealed air chamber so that the anchor of itself has sufficient buoyancy for flotation, which comprises buoyantly moving the anchor to the desired latitude and longitude and positioning the device with a cable means extended therefrom and buoyantly supported from point to point along the length of the cable means and attached to a buoyant support at its end, opening the air chamber to admit water thereinto whereby to effect a sinking of the anchor, releasing the cable means at said points simultaneously with the sinking of the anchor, and moving said buoyant support toward the point of immersion of the anchor as the anchor descends.

13. A deep-sea-anchor comprising an upwardly convex top wall with a substantially circular lower edge, a substantially circular bottom wall having a diameter smaller than the diameter of the lower edge of the top wall and concentric therewith, and a closing wall substantially in the form of a truncated cone with its smaller end downward and sealed thereat to the periphery of the bottom wall, said closing wall extending upwardly and outwardly and sealed to the top wall for providing with said top and bottom walls a sealed axial air chamber for buoyant flotation of the anchor to position for sinking, means by which the chamber may be flooded for sinking the anchor, the closing wall and the peripheral portion of the top wall which extends beyond the closing wall constituting and providing a downwardly open annular recess adjacent the periphery of the anchor so that the peripheral edge of the top wall provides a bottom-engaging shoe, and a cable attachment at the vertical axis of anchor, said top wall having uniformly distributed openings adjacent its peripheral edge and above the plane of said bottom wall for the passage of air and water from said recess.

14. A deep-sea-anchor comprising an upwardly convex top wall with a substantially circular lower edge providing a shoe for engaging the sea bottom, a substantially circular bottom wall having a diameter smaller than the diameter of the lower edge of the top wall and concentric therewith, and a closing wall substantially in the form of a truncated cone with its smaller end downward and sealed thereat to the periphery of the bottom wall, said closing wall extending upwardly and outwardly and sealed to the top wall for providing with said top and bottom walls a sealed axial air chamber for buoyant flotation of the anchor to position for sinking, said bottom wall being located above the planes of the peripheral edge of said top wall, means by which the chamber may be floated for sinking the anchor, the closing wall and the peripheral portion of the top wall which extends beyond the closing wall constituting and providing a downwardly open annular recess adjacent the periphery of the anchor, and a cable attachment at the vertical axis of the anchor, said top wall having uniformly distributed openings between its peripheral edge and the junction of said closing wall with the top wall and serving for the passage of air and water from said recess, said shoe being effective for engaging the sea bottom before the contact of the bottom wall with said sea bottom, whereby to produce a restriction in the escape of water from beneath the anchor prior to the contact of the bottom wall with the sea bottom, said openings operating after the restriction effect occurs for permitting the continued escape of water from the recess and from beneath the bottom wall at a limited rate whereby to retard and cushion the anchor and limit the shock of engagement of said bottom wall with the sea bottom.

15. A deep-sea-anchor of large size and weight adapted for sinking at a permanent location and comprising an upwardly convex and non-fouling top wall with a substantially circular lower edge providing a shoe for engaging the sea bottom, a substantially circular bottom wall having a diameter smaller than the diameter of the lower edge of the top wall and concentric therewith, said bottom wall being positioned above the normal horizontal plane of the peripheral edge of the top wall, a closing wall sealed to the lower surface of the top wall along a substantially circular line concentric with the said peripheral edge and spaced therefrom, the closing wall extending downwardly and inwardly toward the axis of the anchor and providing with a peripheral portion of the top wall a downwardly opened annular recess of upwardly convergent form in radial cross-section, said closing wall extending to and being sealed to the bottom wall at the periphery of the bottom wall, so that the top, bottom and closing walls provide an air chamber symmetrically disposed about the axis of the anchor for the buoyant flotation of the anchor to position for sinking, means by which the chamber may be flooded for sinking the anchor, and a cable attachment at the vertical axis of the anchor, said top wall having uniformly distributed openings therein between its peripheral edge and the upper edge of said closing wall for the passage of air and water from said recess, and bracing means extending from said bottom wall to said top wall at points of the latter adjacent the peripheral edge thereof for supporting the peripheral portion of the same against relatively upward and outward pressures exerted thereagainst by water in said recess during the downward movement of the anchor during sinking.

EDWARD R. ARMSTRONG.